United States Patent [19]

Peiffer

[11] Patent Number: 4,853,447

[45] Date of Patent: Aug. 1, 1989

[54] POLYMERIZATION OF CATIONIC N,N-DIMETHYLALKYLAMINE TYPE MONOMERS

[75] Inventor: Dennis G. Peiffer, East Brunswick, N.J.

[73] Assignee: Exxon Research and Engineering Company, Florham Park, N.J.

[21] Appl. No.: 136,108

[22] Filed: Dec. 21, 1987

[51] Int. Cl.[4] ............................. C08F 4/28; C08F 2/16
[52] U.S. Cl. .................................... 526/229; 526/219; 526/227; 526/232.1; 526/291
[58] Field of Search ............... 526/217, 219, 229, 232, 526/232.1, 227

[56] References Cited

U.S. PATENT DOCUMENTS

| | | | |
|---|---|---|---|
| 4,064,091 | 12/1977 | Samour | 524/815 |
| 4,708,998 | 11/1987 | Schulz | 526/287 |

Primary Examiner—Christopher Henderson
Attorney, Agent, or Firm—R. E. Nanfeldt

[57] ABSTRACT

A homogeneous free radical copolymerization process for the formation of a copolymer of acrylamide and an cationic monomer derive from allyl halide and N,N-dimethyl alkylamines which comprises the steps of:

(a) forming a mixture of acrylamide monomer and the cationic monomer derive from allyl halide and N,N-dimethyl alkylamines and under a nitrogen atmosphere;

(b) adding deoxygenated water to said mixture to form a homogeneous reaction solution;

(c) adding a free radical initiator to said homogeneous reaction solution to initiate polymerization of said acrylamide monomer and said cationic monomer derived from allyl halide and N,N-dimethylalkylamines; and (d) copolymerizing said acrylamide monomer and said cationic monomer derive from said allyl halide and said N,N-dimethyl alkylamines at a sufficient temperature and for a sufficient period of time to form said copolymer of acrylamide without the formation of substantial amounts of particulates or phase separation occurring, said copolymer having an intrinsic viscosity of about 1 to about 10 dl/g, said copolymer having the formula:

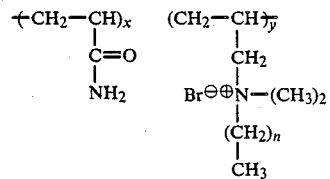

wherein n is 6 to 22 straight chained or branched alkyl or cycloalkyl group and X is about 90 to about 99.9 mole %, and Y is about 0.1 to about 10.0 mole %.

7 Claims, 3 Drawing Sheets

POLYMERIZATION OF CATIONIC N,N-DIMETHYLALKYLAMINE TYPE MONOMERS

Novel cationic monomers (formed with allyl bromide and N,N-dimethylalkylamines) and copolymers containing an alkyl moiety of variable carbon length are formed through conventional synthesis techniques and the solutions formed with these materials possess rheological properties markedly different from those of conventional cationic polyelectrolytes.

BACKGROUND OF THE INVENTION

It is well known that polymeric materials are generally considered useful as viscosification agents when dissolved in an appropriate solvent system. The major reason for this viscosity enhancement is due to the very large dimensions of the individual polymer chain as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a soluble polymer is useful for thickening solvents, while a water soluble polymer is appropriate for increasing the viscosity of aqueous systems. With regard to aqueous solutions, soluble nonionic polymers and high charge density sulfonated or carboxylate polyelectrolytes are quite useful in this regard and are commonly used materials. However, the solution properties of the former family of materials are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration or simply $C^*$. It should be noted that in most nonionic polymers of commercial interest, a relatively large amount of polymer is required prior to reaching $C^*$. Therefore, this approach is undesirable from an economic viewpoint. Moreover, the rheological properties of many of these nonionic systems have been published. The results of these studies show that, in general, these solutions are shear thinning over all shear rates investigated.

Polyelectrolytes, on the other hand, are very useful and the most commonly used materials. However, the solution properties of these materials begin to deteriorate as low molecular additives (i.e., acids, bases or salts) are dissolved in the solution. These additives screen the charges that are fixed along the chain backbone which results in a decrease in the dimensions of the polymer molecule. The viscosity diminishes as long as the chain continue to shrink.

It has been found previously (U.S. Pat. Nos. 4,460,758 and 4,450,496), for example, that intrapolymer complexes, composed of a nonstoichometric ratio of cationic and anionic monomeric units, can be useful in viscosifying aqueous solutions systems (as required in a variety of well control and workover fluids; i.e., water based drilling fluids and acid gelation systems). More importantly, these polymeric materials possess higher viscosity in acid, base or salt solution than in the corresponding fresh water system. Even more interesting is the observation that these polymeric materials show a corresponding viscosity enhancement as the concentration of the dissolved acid, base or salt is increased, even though the polyampholyte contains a substantial amount of dissociable charge. These viscosity results are unexpected since the general tendency of charged macromolecules in these types of aqueous solution shows a marked decrease in thickening efficiency.

Furthermore, in recent years, interpolymer complexes have received considerable attention in the literature due to their interesting and unique properties. In most instances, these complexes are formed by intimately mixing aqueous solutions containing high-charge density polyelectrolytes possessing opposite charge. When these polymer molecules meet in solution, the interaction between oppositely charged sites will cause the release of their associated counterions forming the complex. The counterions are now free to diffuse into the bulk solution. Normally, phase separation occurs upon prolonged standing in these high-charged density complexes. As a result, these materials have poor viscosification properties. In previous U.S. patents it is reported that low-charge interpolymer complexes are soluble and effective in viscosifying aqueous solution systems. More importantly, these complexes possess a substantially higher viscosity than the corresponding individual low-charge density copolymer components. As detailed earlier, these characteristics are unexpected since high-charge density complexes are insoluble in these conventional solution systems.

Even more interesting is the unique and unexpected result that these soluble interpolymer complexes are capable of enhancing the viscosity of aqueous solutions under relatively broad shear conditions. With these unique polymeric materials, dilatant behavior occurs in aqueous fluids which are of extreme technological utility. It is further noted that under the identical experimental conditions, the viscosity of the individual copolymer components show the normal shear thinning behavior.

This invention teaches that a novel family of cationic copolymers containing a unique family of cationic-alkyl containing (i.e. N,N-dimethylakyamine type functionalities) monomer moieties are useful in viscosifying fresh water and even high brine environments and, more importantly, these polymeric materials have improved and different solution properties as compared to conventional polyelectrolytes and nonionic polymers. These polymers are synthesized via conventional synthetic techniques without the use of surfactants, for example. These cationic alkyl-containing monomers are inherently water soluble.

These copolymers are based on, but not limited to, the incorporation of the above cationic monomers into an acrylamide backbone structure.

It is well known that polyacrylamide and hydrolyzed polyacrylamide are water soluble polymers that have been previously disclosed in the literature and have found application in the viscosification of aqueous solutions. This is achieved through a combination of high molecular weight and chain expansion due to repulsion of pendant ionic groups along the polymer chain. However, high molecular weight polymers present well known difficulties in manufacture and subsequent processing because of their irreversible degradation when exposed to conditions of high shear such as would be obtained in the usual stirring devices. Moreover, the presence of pendant ionic groups leads to solution properties which are markedly influenced by the presence of dissolved cations. In particular, the viscosity of solutions of these polymers usually decreases strongly upon increasing concentrations of brine.

We have discovered an alternative means for providing polymers which viscosify water or brine at low concentrations. This method relies on the incorporation of a small amount of hydrophobic groups into a polymer with a water soluble backbone. These hydrophobic groups tend to associate with one another in an aqueous solution, and when the association occurs intermolecularly, the solution viscosity may be increased relative to the polymer without the hydrophobic side groups. An additional benefit is that the solution viscosity is relatively insensitive to salts because the hydrophobic groups are not ionic.

The synthesis of copolymers composed of water soluble and water insoluble monomers presents difficulties. In order for polymerization to be effected, the monomers must obviously come into close proximity to one another. A variety of processes based upon prior art could conceivably achieve this, but have serious deficiencies, necessitating the instant invention. For example, simply dispersing the water insoluble monomer as fine particles in the aqueous medium, while dissolving the water soluble monomer in water would result in poor incorporation of the water insoluble monomer and would lead to a heterogeneous product of particles dispersed in the predominantly water soluble polymer. This would therefore require the extra step of separating the unreacted monomer particulates from the reaction product.

Conventional emulsion polymerization, which uses a surfactant to disperse the water insoluble monomer into the aqueous medium containing the dissolved water soluble monomer, has other disadvantages. In this process, the bulk of the water insoluble monomer is contained initially in droplets which are at least one micron in diameter. These droplets must be stabilized against coalescence by a combination of agitation and added surfactant. The product copolymer is usually in the form of particulates with diameters on the order of 500 to 2000 Å in diameter.

Alternatively, both monomers may be dissolved in a solvent or solvent mixture having properties intermediate between water and a hydrocarbon solvent. Although this undoubtedly allows the comonomers to come into close proximity to one another, since the dispersion is on a molecular scale, this process presents other difficulties. For example, often the copolymer is insoluble in the mixed solvent which is capable of solubilizing the monomers. This leads to precipitation of the copolymer when it has a molecular weight which is still too low to produce efficient viscosification. The reaction product is usually heterogeneous which therefore requires a disadvantageous additional processing step. Furthermore, the water miscible solvents such as alcohols, acetone, ethers and acetic acid are fairly good chain transfer agents and when used in reasonable quantities would lead to decreased molecular weights and hence poor viscosification efficiency.

It should be noted in this regard that the use of hydrophobic groups on water soluble polymers to enhance the rheological properties of water based fluids has been described. One approach to provide polyacrylamide based systems containing hydrophobic groups is described by Bock, et al., U.S. Pat. Nos. 4,520,182 and 4,528,348. Water soluble acrylamide copolymers containing a small amount of oil soluble or hydrophobic alkylacrylamide groups were found to impart efficient viscosification to aqueous fluids. Landoll, U.S. Pat. No. 4,304,902, describes copolymers of ethylene oxide with long chain epoxides which also required relatively large polymer concentration (approximately 1%) for thickening water and required surfactants for solubility due to irregularities in the polymerization. In the related case, U.S. Pat. No. 4,428,277, modified nonionic cellulose ether polymers are described. Although these polymers show enhanced viscosification relative to polymers not containing hydrophobic groups, the viscosification efficiency was very low, requiring 2 to 3 weight percent polymer to provide an enhancement. The use of surfactants to enable solubility and, in turn, viscosification, by a water soluble polymer containing hydrophobic groups is described by Evani, U.S. Pat. No. 4,432,881. The hydrophobic groups claimed are attached to the polymer via an acrylate linkage which is known to have poor hydrolytic stability. In addition, the need for a surfactant to achieve solubility and thickening efficiency should make such a system very salt sensitive, as well as very sensitive to small changes in surfactant and polymer concentrations. Emmons, et al., U.S. Pat. No. 4,395,524, teaches acrylamide copolymers as thickeners for aqueous systems. While these polymers possess hydrophobic groups they are prepared using alcohol containing solvent which are known chain transfer agents. The resulting polymers have rather low molecular weights and, thus, relatively high polymer concentrations are required to achieve reasonable viscosification of water based fluids.

SUMMARY OF THE INVENTION

A process for producing copolymers of water soluble monomers with water soluble hydrophobic monomers has been discovered to yield efficient viscosifiers of aqueous media. The process relies on the complete solubilization of water insoluble hydrophobic monomers by means of a cationic charge chemically bound to the alkyl-containing monomer. As a result, the hydrophobic monomer is completely capable of producing a clear, uniform homogeneous mixture in the presence of the other well-known water soluble monomers and which remains clear, uniform and a homogeneous mixture with no phase separation as the polymerization reaction proceeds toward completion. These cationic-type monomers may inherently form micelles which are minute aggregates, consisting of on the order of 50–200 individual monomer entities. This is accomplished without the need of any other surfactant as in micellar and microemulsion type polymerizations. The former micelles are stable toward phase separation and are effectively dispersed on a very fine scale so that the copolymerization is effected without the formation of latexes or fine particulates.

The copolymers which may be isolated from the reaction mixture, form aqueous solutions which are very efficient viscosifiers of water or brine, having molecular weights such that their intrinsic viscosities are greater than about 1 dl/g, but not so high that they are extremely susceptible to shear degradation.

DETAILED DESCRIPTION OF THE INVENTION

Figure 1:
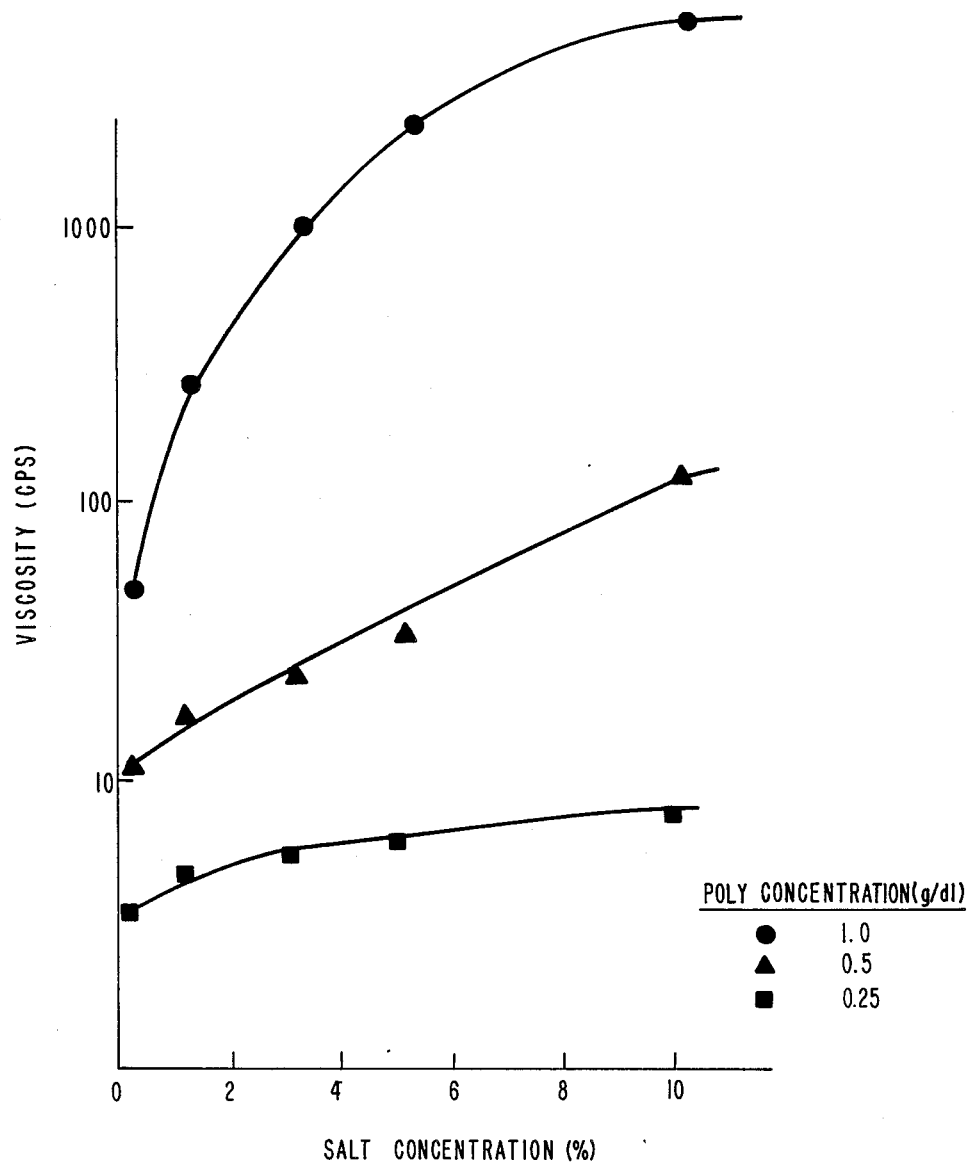
FIG. 1 illustrates a plot of viscosity versus salt (NaCl) concentration for an acrylamide/11868-148B (n=13) copolymer prepared by the homogeneous, surfactant-free solution polymerization process.

The process of this invention overcomes the difficulties experience in conventional polymerizations just described. In particular, it enables the copolymerization of the water soluble monomer, acrylamide, and water soluble monomers such as an allyl halide derivatives using N,N-dimethylalkylamines to give copolymers which are efficient aqueous viscosifiers.

The process relies on the solubility of these alkyl derivatives into a predominantly aqueous media. These cationic derivatives form micelles without the utilization of any other surfactant. The reaction mixture is isotropic, clear, and homogeneous.

These micellar reaction mixtures are free of visible oil droplets or particulates of the water insoluble monomer. The polymerization can therefore be initiated by water soluble initiators to give copolymers that are substantially free of visible particulates. The resultant reaction product remains homogeneous throughout the course of the reaction.

Micelles formed by the above described cationic monomers which are water soluble are generally very small aggregates which consist of on the order of 50 to 200 molecules. They form spontaneously upon mixing the components together, i.e., they do not require the vigorous mixing conditions required in conventional emulsion polymerization in which macroemulsions are formed. The macroemulsion droplets of the convention emulsion polymerization process have diameters which are at least 10,000 Å. They therefore tend to phase separate upon standing, leading to undesirable inhomogeneities in the produced copolymer. The homogeneous micellar reaction mixture is, on the other hand, much more stable against demixing than the formulations used in emulsion polymerization processes. Indeed, no stirring is required during the course of the micellar copolymerization—the micellar aggregates remain extremely finely dispersed throughout. Moreover, the extremely dispersed nature of the micellar aggregate permits the copolymerization to occur in such a way that a water soluble copolymer is produced which does not contain particulates or latexes of water insoluble polymers. These would be detrimental in such applications as secondary oil recovery, which requires a product which is substantially free of pore plugging particulates.

An additional important feature is that the resultant copolymer possess both a cationic charge and a hydrophobic unit on the polymer chain without the necessity of further chemical post-treatments. Besides the ease of polymerization to form these hydrophobically associating polymers, the cationic and alkyl group, i.e. hydrophobic entity, gives one a great degree of control of the final polymer structure and of course, physical properties.

Surfactants, although unnecessary as described above, can still be used. The surfactants which may be used in this process may be one of the water soluble surfactants such as salt of alkylsulfates, sulfonates, carboxylates and the like, or nonionic such as ethylene oxide-propylene oxides copolymers, or polyoxyethylene alkyl ethers, etc., or cationic surfactants such as primary alkylamines, dialkyl secondary amines, or ethoxylated fatty amines. Suitable surfactants may be chosen from these on the basis of water solubility and solubilization capacity for any other water insoluble and soluble monomers intentionally added to the polymerization mixture.

Suitable free radical initiators for the copolymerization process are peroxides such as hydrogen peroxide, potassium persulfate, alkyl peroxides and the like. The concentration of the free radical initiator is about 0.01 to about 0.50 grams per hundred grams of acrylamide and allyl halide derivatives of N,N-dimethylalkylamine monomers. The polymerization is conducted in the absence of oxygen at a temperature of about 20° to about 100° C. The polymer may be recovered from the reaction mixture by precipitation by nonsolvents such as acetone.

The water soluble copolymers which are produced by the copolymerization process in the instant invention are characterized by the formula:

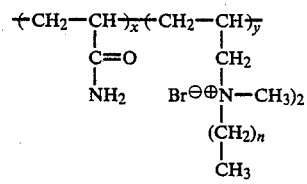

wherein n is preferably 6 to 22 straight chained or branched alkyl or cycloalkyl group, more preferably 6 to 20 and most preferably 6 to 18.

Typical, but non-limiting examples of preferred alkyl groups are hexyl, octyl, decyl, dodecyl and steryl groups. X is preferably about 90.0 to 99.9% mole %, more preferably about 95.0 to about 99.8 mole %, and most preferably about 97.0 to about 99.5 mole % is preferably abut 10.0 to about 0.1 mole %, more preferably about 5.0 to about 0.2 mole % and most preferably about 3.0 to about 0.5 mole %. These water soluble copolymers are of a sufficiently high molecular weight that they are efficient viscosifiers of water or brine, but not so high that they are readily susceptible to irreversible shear degradation. These copolymers have intrinsic viscosity of greater than about 1 dl/g and less than about 10 dl/g.

DESCRIPTION OF THE PREFERRED EMBODIMENT

The following examples explain the invention, which are by way of illustration, but not of limitation.

EXAMPLE 1

Cationic-Hydrophobic Monomer

Three representative examples for the synthesis of the following monomer structures to form these cationic monomers is described below:

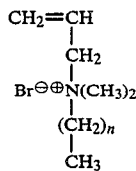

In these representative examples n=15 (11868-106A), n=13 (11868 - 106B) and n=17 (11868-106C).

Into a small round bottom flask add the following materials together and heat to 50° C. for four hours:

| 11868-106A | 14.2 g allyl bromine |
| | 31.6 g N,N—dimethyl dodecylamine |
| 11868-106B | 14.2 allyl bromide |
| | 28.3 g N,N—dimethyl tetradecylamine |
| 11868-106C | 14.2 g allyl bromide |
| | 34.9 g N,N—dimethyl octadecylamine |

The monomers are further purified through conventional analytical techniques. Elemental and NMR analysis confirms that the monomers are very pure (>99%) and has, in these specific examples, the following molecular structure:

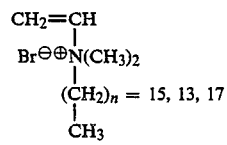

EXAMPLE 2

Copolymer Synthesis

Three representative examples for the synthesis of acrylamide copolymers containing the above described monomers, i.e., n=15, 13 and 17, respectively, is detailed below.

Into a 1 liter - 4 neck round bottom flash add:
47.0 g acrylamide
2.6 g 11868-106A
500 mls distilled water
0.1 g Vazo33 (DuPont product ®)*
*Vazo 33=2, 2'azobis (2,4- dimethyl-4-methoxyvaleronitrile)

The above synthesis (and resultant copolymer) is labelled 11868-148A.

The solution mixture is purged with argon gas for approximately two hours at room temperature and subsequently the low temperature initiator is dissolved into the monomer solution. After 24 hours, the copolymer is precipitated from solution with a large excess of acetone. Subsequently, the copolymer is washed several times with a large excess of acetone and dried in a vacuum oven at 60° C. for 24 hours.

The other two acrylamide-based copolymers were synthesized by a similar procedure except for the replacement of 1186-106A with 11868-106B and 11868-106C. That is for 11868-148B copolymer 2.42g of 11868-106B and for 11868-148C copolymer 2.8 g of 11868-106C were used (i.e. equivalent molar basis). The compositional results from elemental analysis are presented in the following table.

| Composition of the Cationic Copolymers | | | |
|---|---|---|---|
| Designation | Wt % Bromine | Mole % Functionality | n |
| 11868-148A | 0.14 | 0.13 (11868-106A) | 15 |
| 11868-148B | 0.12 | 0.11 (11868-106B) | 13 |
| 11868-148C | 0.15 | 0.14 (11868-106C) | 17 |

As the results clearly show is that, for all practical purposes, the composition of the copolymers are identical in cationic activity, but, of course, differ in the alkyl length on the cationic monomer units. This apparently minor change in copolymer structure has a profound influence on solution rheology.

EXAMPLE 3

Rheology

Figure 2:
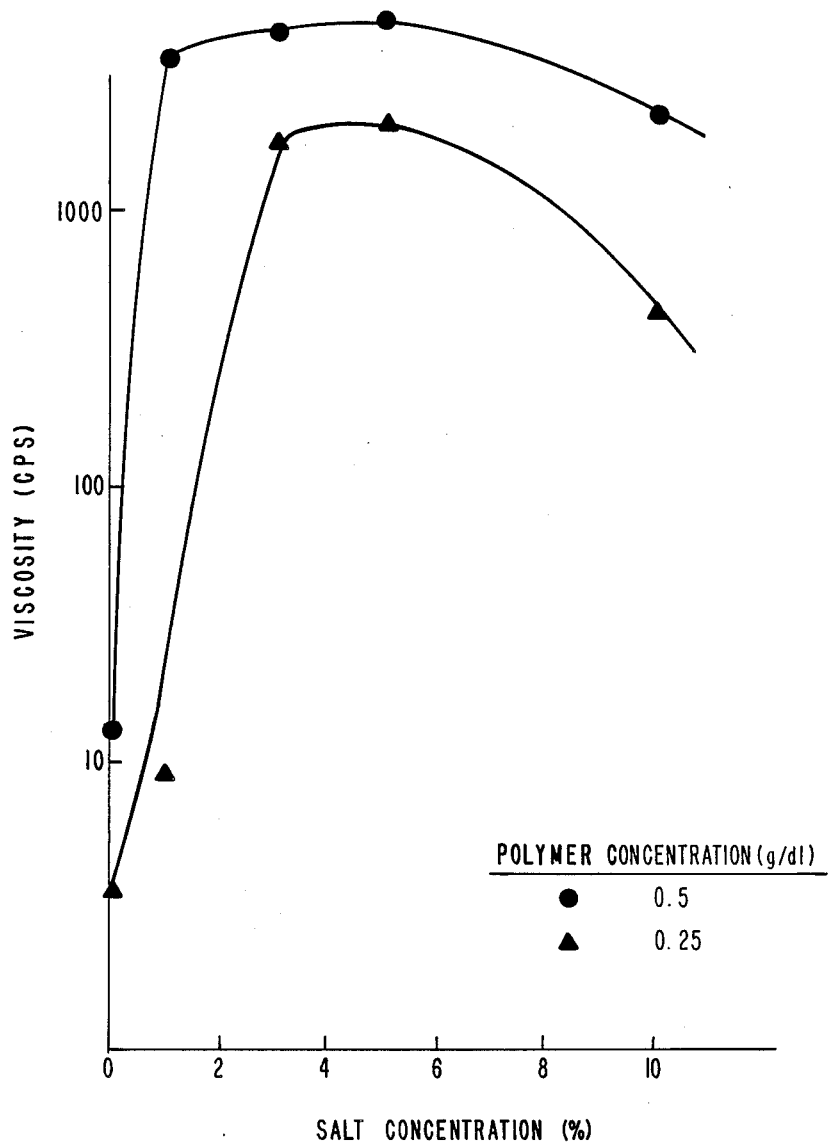
FIG. 2 illustrates a plot of viscosity versus salt (NaCl) concentration for an acrylamide/11868-148A (n=15) copolymer prepared by the homogeneous, surfactant-free, solution polymerization process.
Figure 3:
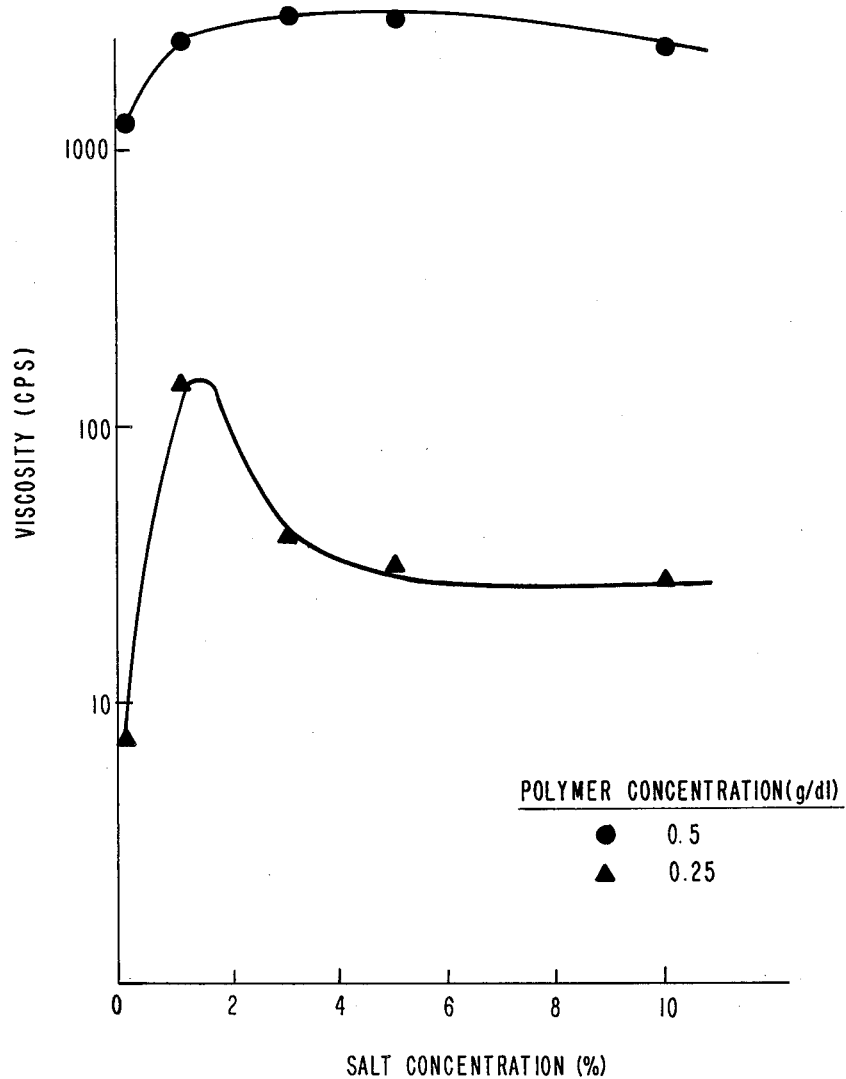
FIG. 3 illustrates a plot of viscosity versus salt (NaCl) concentration for an acrylamide/11868-148C (n=17) copolymer prepared by the homogeneous, surfactant-free, solution polymerization process.

Representative rheological properties of the above described copolymers are presented in FIGS. 1, 2 and 3. These properties were examined in both fresh and brine (sodium chloride) solutions systems.

FIG. 1 shows the viscosity-salt concentration profiles of the 11868-148B copolymer (alkyl length, n=13) as a function of polymer concentration. A close examination of the data clearly confirms the unique viscosification of this copolymer as the brine level is enhanced. In all instances, the viscosity is markedly improved with increasing brine additions at constant polymer levels. Interestingly, the viscosity becomes increasingly time dependent at these higher salt levels. In comparison, conventional polyelectrolytes show a dramatic loss in viscosity under the identical solution conditions.

Increasing the alkyl length by 2 "carbon atoms", i.e., n=15 (copolymer 11868-148A) further changes in the rheological properties of the aqueous fluids are measured; even though in all instances notes here, the level of cationic functionality is quite modest. In FIG. 2, the rheological properties are improved by several orders of magnitude at equivalent polymer and salt levels. Interestingly, however, the viscosity values drop at the higher salt levels. This does not deter, however, the utilization of these unique copolymers in fluids of technological interest since the viscosity is quite high even at high brine levels.

Further increases in the alkyl length, i.e., n=17 produces soluble copolymers which are still effective viscosifiers of both fresh and brine solutions (FIG. 3). It is noted, however, that the rheological properties are not as high as previously noted. This could be due, in part, to the decreased solubility of the higher alkyl length substituents, a relative decrease in the second virial coefficient and a decrease in the overall molecular distribution of this particular copolymer sample. Again, however, this does not deter from the appropriate utilization of this unique copolymer.

The above described rheological properties of these polymers depend strongly on molecular weight, polymer concentration, cationic functionality and alkyl length (n) and, of course, brine concentration. That is, improved rheological properties would be found with increases (and possibly decreases) in the above mentioned variables.

These types of copolymers are useful as rheological control additives, well control and workover fluids, cutting fluids, completion fluids, antimisting additive, drag reducing agent and the like. Included in these applications are enhanced oil recovery techniques, water based drilling fluids, membrane applications, water borne coating and the like.

We also should note that when these polymers are placed in an aqueous solvent the hydrophobic groups aggregate or associate in a manner similar to a surfactant. This hydrophobic association between polymer chains in solution results in an increase in the hydrodynamic size of the molecule, which, in turn, causes an increase in viscosity.

What is claimed:

1. A homogeneous free radical copolymerization process for the formation of a hydrophocially associating copolymer of acrylamide and an catonic monomer derive from ally halide and N,N-dimethyl alkyamines which consisting of the steps of:
   (a) forming a mixture of acrylamide monomer and the cationic monomer derive from allyl halide and N,N-dimethyl alkylamines and under a nitrogen atmosphere;
   (b) adding deoxygenated water to said mixture to form a homogeneous reaction solution wherein said cationic monomer forms micelles in said homogeneous reaction solution, said micelles being aggregates of about 50 to about 200 molecules of said cationic monomer;
   (c) adding a free radical initiator to said homogeneous reaction solution to initiate polymerization of said acrylamide monomer and said cationic monomer derived from allyl halide and N,N-dimethylalkylamines; and
   (d) copolymerizing with no phase separation said acrylamide monomer and said cationic monomer derive from said allyl halide and said N,N-dimethyl alkylamines at a sufficient temperature and for a sufficient period of time to form said copolymer of acrylamide without the formation of substantial amounts of particulates or phase separation occurring, said copolymer having an intrinsic viscosity of about 1 to about 10 dl/g, said copolymer having the formula:

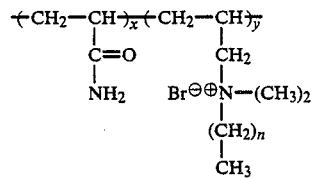

wherein n is 6 to 22 straight chained or branched alkyl or cycloalkyl group and X is about 90 to about 99.9 mole %, and Y is about 0.1 to about 10.0 mole %.

2. A process according to claim 1 wherein said copolymer is water soluble.

3. A process according to claim 1 or 2 further including recovering said copolymer from said reaction solution.

4. A process according to claim 1 or 2 wherein the N,N-dimethyl alkyl amines has an alkyl group which is selected from the group consisting of hexyl, octyl, decyl, dodecyl or hexadecyl groups.

5. A process according to claim 1 or 2 wherein said free radical initiator is selected from the group consisting of sodium thiosulfate, potassium persulfate, benzoylperoxide.

6. A process according to claim 1 or 2 wherein said polymerization is carried out at about 0 to about 70° C. for about 1 to about 48 hours.

7. A process according to claim 1 or 2 wherein a concentration of said acrylamide monomer and said cationic monomer derived from allyl halide and N,N-dimethyl alkylamine in said reaction solution is about 0.1 to about: 50.0 grams of said acrylamide monomer and said cationic monomer derived from allyl halide and N,N-dimethylalkylamine per 100 grams of water.

* * * * *